Apr. 3, 1923.

Re. 15,572

G. G. SCHELTER

LAST

Original Filed Aug. 8, 1919

INVENTOR.
George G. Schelter
By his Attorney
Nelson M. Emanuel

Reissued Apr. 3, 1923. Re. 15,572

UNITED STATES PATENT OFFICE.

GEORGE G. SCHELTER, OF ROCHESTER, NEW YORK, ASSIGNOR, BY MESNE ASSIGNMENTS, TO UNITED LAST COMPANY, OF AUBURN, MAINE, A CORPORATION OF MAINE.

LAST.

Original No. 1,372,779, dated March 29, 1921, Serial No. 316,219, filed August 8, 1919. Application for reissue filed June 30, 1921. Serial No. 481,711.

*To all whom it may concern:*

Be it known that I, GEORGE G. SCHELTER, a citizen of the United States, residing at Rochester, in the county of Monroe and State of New York, have invented new and useful Improvements in Lasts, of which the following is a specification.

This invention relates to collapsible lasts for making boots and shoes and is illustrated in connection with a preferred type of hinge last. It has been found advisable to provide lasts of this type with some sort of "locking means" or mechanism to hold their parts in desired positions. When the last is in the shoe it should be held in the normal or extended position with sufficient rigidity to avoid any danger of its collapse during the shoemaking operations, and a locking means of the positive type is often regarded as highly desirable. Many locks of this type have been proposed, all of which are subject to serious difficulties. The lock after disengagement to permit the collapse of the last, must be held disengaged at least while the collapsing movement is begun. In the case of lasts heretofore suggested as practical solutions of this problem, the disengagement and retention was accomplished by the operator's fingers in which case the fingers were often injured in the collapse of the last; or else some special appliance was used in connection with the jack used in withdrawing the last.

Inasmuch as it is sometimes necessary to withdraw the last at other times than the regular last pulling, such a last lock requires special jacks located more or less widely over the shoe factory, the jacks being necessarily so specialized as to render them inconvenient or impractical for use in connection with lasts of other makes. Shoe manufacturers are unwilling to equip their factories with such special jacks, and this has militated against the use of hinge lasts having positive locks.

It is accordingly an important object of the invention to provide an improved collapsible last which will obviate this and other difficulties heretofore encountered. An important feature of the invention consists in a last embodying a novel positive lock, the locking element of which when moved out of positive locking position will be automatically held out of said position so that accidental return thereto is avoided. The positively locked condition can thus be definitely terminated and with the last in any convenient position in the operator's hands so that no special jack is required for unlocking the last.

Another important feature of the invention consists in provision for automatic termination of the retention of the locking member out of positive locking position. This is accomplished by the relative movement of the last parts in changing the length of the last, the locking member requiring no treatment by the operator. In the last shown, it is accomplished by the collapsing movement of the parts, but in any case it will preferably be accomplished by the time the last parts reach extended position after collapse, so that the positive lock becomes available at that time for immediate and preferably automatic operation.

It is a further important object of the present invention to provide a hinge last with a positive lock arranged to be rendered impositive at will. The last can thus be collapsed on the ordinary jack, and removed without difficulty, at the same time affording the desired rigidity and without sacrificing any of the advantages of known lasts.

Another feature resides in a construction whereby the last parts are relatively displaced slightly from normal extended position when the last is impositively locked.

These and other features of the invention, comprising various arrangements and combinations of parts, will be understood from the following description of a preferred embodiment of the invention, selected for illustrative purposes, and shown in the drawings in which, Figure 1 shows the last in extended position.

The last shown is a collapsible last having a heel part and forepart separated by secant faces and united by hinge mechanism. The cut and hinge mechanism may be of any form providing conveniently for the embodiment of the present invention, and I have found the last invented by John C. Schelter which is disclosed and claimed in his application Serial No. 267,757, filed Dec. 21, 1918, Patent No. 1,423,740, issued July 25, 1922, to be admirably adapted for the embodiment of my invention, but the invention, though shown as applied thereto, is not to be understood as limited to this specific form of last.

Figure 5:
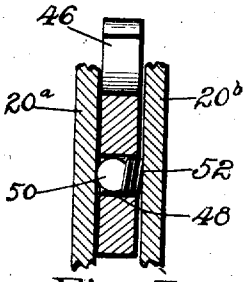
Figure 5 is a cross-section on the line 5—5 of Fig. 1.

The cut between the heel part and the forepart is vertically directed from the sole for a short distance into the body of the last as shown at 10; from there it slopes to the front, as shown at 12, until it reaches approximately the center of the last. At this point the heel part and forepart separate, the cut going upwardly and inclining slightly to the rear upon the heel part, as shown at 14, and forward, as shown at 16, upon the forepart at a somewhat greater slope than the portion 12, as far as a point about three-quarters of the height of the last and from there nearly vertically, as shown at 18, to the top of the cone. The fore and heel parts are united by two links. These links are preferably formed in duplicate with the locking mechanism between them as shown in Fig. 5. The upper link is formed of two separate parts $20^a$ and $20^b$ and the lower link is similarly formed of two parts $22^a$ and $22^b$. These links are joined to the last parts by rivets 24, 26, 28 and 30, passing through the links and seated in the last parts. All the foregoing structure is substantially as shown in the application of John C. Schelter above referred to.

Figure 1:
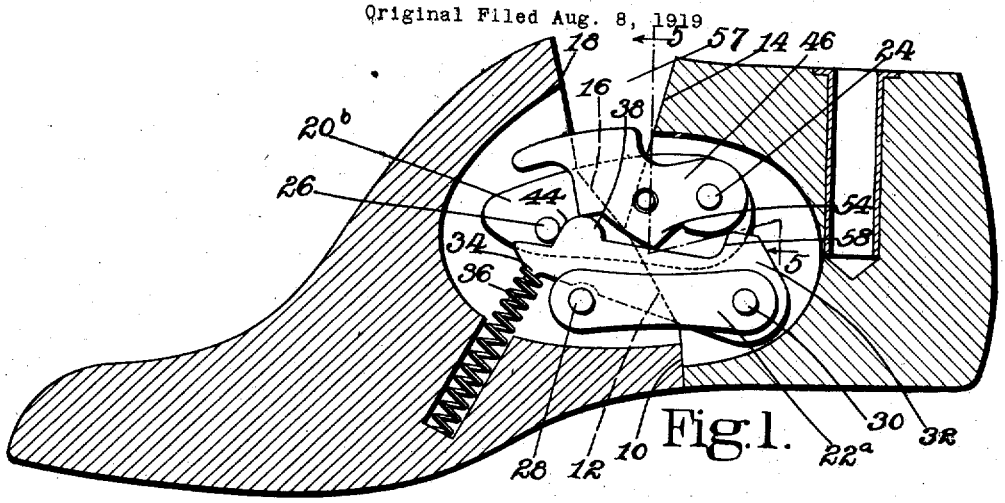

The rivet 26 acts as an abutment for the locking means. The locking member is shown as a flat steel plate 32 pivoted at one end upon the rivet 30 between the plates $22^a$ and $22^b$. It has at its other end a downwardly projecting lug 34 arranged to engage a spring 36 seated in one of the last parts (as illustrated, the forepart), and has on the upper surface of the same end a projection 38 arranged to co-operate with the pin 26. This projection 38 has two operating surfaces, one of which, 40, is nearly perpendicular to the radius vector 42 extending thereto from the rivet 30, and the other of which, 44, is at an acute angle with said radius vector. The portion 40 when in engagement with the rivet 26, as shown in Fig. 1, will positively lock the last in extended position since the reaction between the pin 26 and the locking member is substantially perpendicular to the surface 40, and the slight divergence from perpendicularity between the surface 40 and the line 42 enables the locking member to wedge tightly against the pin 26 under the action of the spring 36. But if the locking member is moved and held in the position shown in Fig. 2, with the surface 44 in engagement with the pin 26, a collapsing pressure will cause a relative slipping motion between the pin and the surface 44 which will permit the last to be collapsed by pressure alone.

This movement of the member 32 may be contrived in various ways, but I have found the following described construction advantageous. A member 46 is pivoted, preferably upon the pin 24, and has a hole 48 conveniently located in it to receive a ball 50 and a spring 52. The member 46 is located between members $20^a$ and $20^b$ and the spring-pressed ball frictionally holds the member 46 in any position in which it happens to be. The member 46 has on its lower surface a lug 54 and a lug 56. The lug 54, as shown in Fig. 1, normally rests on the upper surface of the member 32. The member 46 extends up into the opening 57 between the last parts so as to be easily accessible to the operator. When displaced by the operator it forces down the member 32 so that the surface 44 is exchanged for the surface 40 in contact with the pin 26. At the same time, the lug 56 slips down behind the projection 38, and wedges the member 32 firmly in the position shown in Fig. 2. At the same time, the stress exerted by the spring 36 rotates the links $20^a$, $20^b$ and $22^a$, $22^b$ and the lock member slightly so as to cause a slight relative displacement of the last parts, all of which is clearly shown in Fig. 2. This displacement serves as a warning to the operator, in case the last is in a shoe, that the last is impositively locked.

Figure 2:
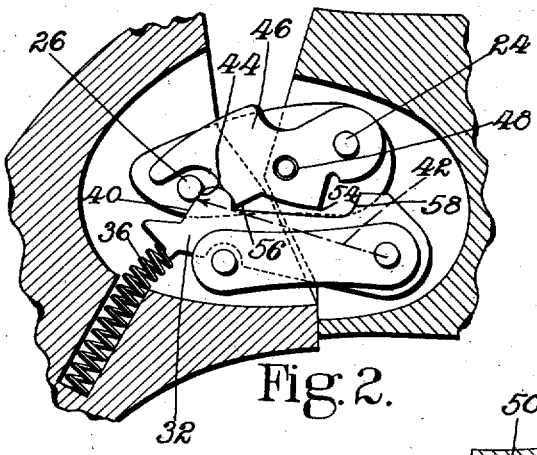
Figure 2 shows the last after the lock has been rendered impositive.
Figure 3:
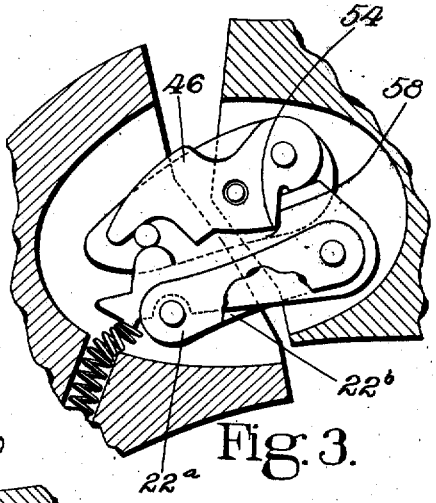
Figure 3 shows the last partially collapsed.
Figure 4:
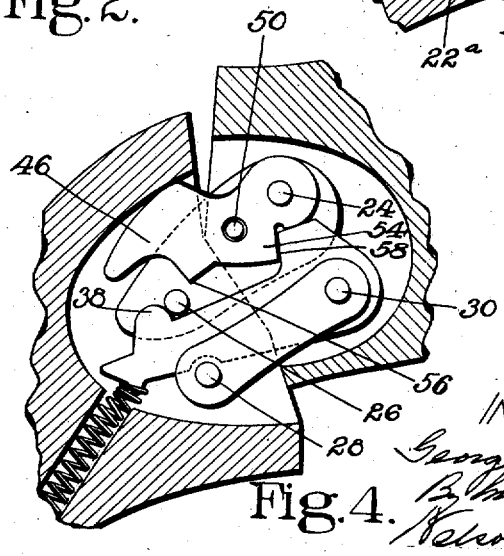
Figure 4 shows the last completely collapsed.

The last is now collapsible by pressure alone and can be removed from the shoe by the simple and well-known expedient of putting the last upon an upwardly extending jack pin and manipulating the last and shoe in the ordinary manner. This will cause the last to pass through the position shown in Fig. 3 to that shown in Fig. 4. The surface 44 and pin 26 form two abutments which begin to slide on each other relatively clockwise, as seen in Fig. 2, and the projection 38 is thus forced away from the lug 56 by the pressure and relative movement. The member 32 is preferably provided with an upstanding lug 58 which engages the member 46 on the rear face of the lug 54 as the last moves from the Fig. 3 position to the completely collapsed position shown in Fig. 4. The reaction between the lugs or abutments 58 and 54 throws the member 46 upwardly, as shown in Fig. 4, so that when the last is brought back to extended position the member 46, being frictionally held by the ball 50, will not fall back with the lug 56 engaging behind the lug 38. The last, therefore, when extended will always come to positively locked position.

It is obvious that the duplicated hinge link construction is not material to the present invention but it makes the last stronger and better able to resist twisting strains of the leveling operation.

It is now clear that my novel last while providing a positive lock and thereby furnishing ideal conditions for machine shoemaking can be unlocked without the use of any special tools or without requiring a special jack. The member 46 can be easily moved by the operator's finger to render the last impositively locked and the last can be collapsed by pressure alone upon any ordinary jack pin. The last therefore provides the important advantages of retention of the locking member out of positive locking position without effort or attention from the operator, and without the use of special tools, and of its automatic restoration to positive locking position as the last is extended after collapse, and also combines with them all the heretofore known advantages of a positive lock with those of an impositive lock.

Having described my invention, what I claim as new and desire to secure by Letters Patent of the United States is:—

1. In a last, separate fore and heel parts, bonding mechanism joining said parts constructed and arranged to permit the collapse of the last, a locking member movable on one of said last parts to engage the other last part in two relations prior to any substantial collapsing movement, to hold the last rigidly extended and impositively locked, respectively, and a member independent of the locking member actuatable to change one of said relations to the other at will.

2. In a last, separate fore and heel parts, bonding mechanism joining said parts constructed and arranged to permit the collapse of the last, a locking member movable on one of said last parts to engage the other last part in two relations to hold the last rigidly extended and impositively locked, respectively, and a member, movable relatively to the locking member, actuatable to change one of said relations to the other at will.

3. In a last, separate fore and heel parts, bonding mechanism joining said parts constructed and arranged to permit the collapse of the last, a locking member movable on one of said last parts to engage the other last part substantially perpendicularly to effect a positive lock or substantially acutely to hold the last impositively locked prior to collapse, and a member actuatable to move relatively to the locking member and to move it from its positively locking position to its impositively locking position.

4. In a last, separate fore and heel parts, bonding mechanism joining said parts constructed and arranged to permit the collapse of the last, a member movable on one of said last parts to engage the other last part substantially perpendicularly to effect a positive lock or substantially acutely to hold the last inpositively locked, and a separate swinging member actuatable to change one of said relations to the other at will.

5. In a last, separate fore and heel parts, bonding mechanism joining said parts constructed and arranged to permit the collapse of the last, an abutment on one last part, a swinging member on the other last part having two surfaces either of which is swingable into engagement with said abutment, respectively, to hold the last positively or impositively locked against collapse, and a member engageable with the swinging member to swing the latter.

6. In a last, separate fore and heel parts, bonding mechanism joining said parts constructed and arranged to permit the collapse of the last, an abutment on one last part, a swinging member on the other last part having two surfaces either of which is swingable into engagement with said abutment, respectively, to hold the last positively or impositively locked against collapse, and a member constructed and arranged to move the swinging member to exchange the surfaces in contact with the abutment.

7. In a last, separate fore and heel parts, bonding mechanism joining said parts constructed and arranged to permit the collapse of the last, an abutment on one last part, and a swinging member on the other last part having a surface substantially at right angles to its radius vector to the axis of swing and a second surface making an acute angle with said radius vector, said surfaces being constructed and arranged to cooperate with the abutment to hold the last positively and impositively locked prior to any substantial collapsing movement, respectively.

8. In a last, separate fore and heel parts, bonding mechanism joining said parts constructed and arranged to permit the collapse of the last, an abutment on one last part, a swinging member on the other last part having a surface substantially at right angles to its radius vector to the axis of swing and a second surface making an acute angle with said radius vector, and a member distinct from the swinging member constructed and arranged to move said swinging member to move one surface out of and the other into engagement with said abutment.

9. In a last, separate fore and heel parts, bonding mechanism joining said parts constructed and arranged to permit the collapse of the last, an abutment on one last part, a swinging member on the other last part having a surface substantially at right angles to its radius vector to the axis of swing and a second surface making an acute angle with said radius vector, and a member constucted and arranged to move said swinging member to move one surface out of and the other into engagement with said abutment and to lock the swinging member in the second position.

10. In a last, separate fore and heel parts, bonding mechanism joining said parts constructed and arranged to permit the collapse of the last, a member on one of said last parts constructed and arranged to thrust against the other last part in two relations to hold the last rigidly extended and to permit collapse by pressure, respectively, a member actuatable to change one of said relations to the other at will, and means for moving said second-named member to inoperative position as the last is collapsed.

11. In a last, separate fore and heel parts, bonding mechanism joining said parts constructed and arranged to permit the collapse of the last, a positive locking means, and an impositive locking means permitting collapse of the last by pressure only, and a member for moving the positive locking means out of operation and so retaining it, prior to collapse, said positive locking means going automatically into operation as the last is extended after collapsing.

12. In a last, separate fore and heel parts, bonding mechanism joining said parts constructed and arranged to permit the collapse of the last, a locking mechanism, comprising an abutment and a locking member cooperating with the abutment having positive and impositive locking positions, and a member accessible to the operator for moving the locking member from positive to impositive locking position to permit collapse of the last by pressure, said accessible member being constructed and arranged by contact with an element of the locking mechanism to be moved into inoperative position before the last reaches extended position after collapse.

13. In a last, separate fore and heel parts, bonding mechanism joining said parts constructed and arranged to permit the collapse of the last, a locking member having positive and impositive locking positions, and a member accessible to the operator for moving the locking member from positive to impositive locking position, to permit collapse of the last by pressure, and means for moving said accessible member into inoperative position as the last is collapsed.

14. In a last, separate fore and heel parts, bonding mechanism joining said parts constructed and arranged to permit the collapse of the last, a normally positive lock, and means for rendering said lock impositive at will, said last parts being automatically slightly relatively displaced from extended position when impositively locked.

15. A locking member for a collapsible last having a portion constructed and arranged to engage an abutment in one last part and an operating member for latching said locking member against automatic return to a locking relation to said abutment when displaced therefrom, said locking member having a portion constructed and arranged to engage the operating member for moving said member to inoperative relation to the locking member as the last collapses.

16. In a last, separate fore and heel parts, and a mechanism between said parts comprising bonding members constructed and arranged to permit the collapse of the last, and comprising a locking member arranged to lock the last positively against collapse, the locking member being further arranged to move into operative engagement with an element of the said mechanism upon being displaced from positive locking position, whereby it is held against accidental return to said positive locking position, and to be moved out of operative engagement with the said element by the operation of collapsing the last, whereby the last, when extended, may be again positively locked.

17. A last comprising a heel part and a forepart arranged for relative collapsing movement, a locking member for positively holding the said parts against said collapsing movement, self-locking means for holding the said locking member against automatic return to positive locking position when disengaged therefrom, prior to any substantial collapsing movement, and means for automatically restoring it to positive locking operativeness during the relative movement of the last parts in changing the length of the last.

18. A last comprising a heel part and a forepart arranged for relative collapsing movement, a locking member for positively holding the said parts against said collapsing movement, self-locking means for holding the said locking member out of positive locking position when disengaged therefrom, prior to any substantial collapsing movement, and means for automatically restoring it to positive locking operativeness by virtue of relative movement of the last parts following the initial collapsing movement.

19. A last comprising a heel part and a forepart arranged for relative collapsing movement, a locking member for positively holding the said parts against said collapsing movement, means acting automatically for holding the said locking member out of positive locking position, rendered operative by its movement of the locking member out of positively locking position prior to any substantial collapsing movement, and means for automatically restoring it to positive locking operativeness by virtue of relative movement of the last parts following the initial collapsing movement, such restoration to positive locking operativeness being completed by the time the last is fully extended after collapse.

20. A last comprising a heel part and a forepart arranged for relative collapsing movement, a locking member for positively holding the said parts against said collapsing movement, and means for holding the said locking member out of positive locking position when disengaged therefrom, the parts being constructed and arranged to terminate automatically the action of said means during the collapsing operation whereby the last may be positively locked when re-extended.

21. A last comprising a heel part and a forepart arranged for relative collapsing movement, a locking member for positively holding the said parts against said collapsing movement, a holding member mounted in the last self-actingly to hold the locking member against automatic return to positive locking position when displaced therefrom preparatory to collapse and means for automatically determining the operation of said holding member during the relative movement of the last parts in collapse.

22. A last comprising a heel part and a forepart arranged for relative collapsing movement, a locking member for positively holding the said parts against said collapsing movement, a holding member mounted in the last automatically to hold the locking member against automatic return to positive locking position when displaced therefrom preparatory to collapse, and means for determining the operation of said holding member operated by the relative movement of the last parts.

23. A last comprising a heel part and a forepart arranged for relative collapsing movement, a locking member for positively holding the said parts against said collapsing movement, a holding member mounted in the last acting automatically to lock the locking member out of positive locking position when displaced therefrom preparatory to collapse, and means operated by relative movement of the forepart and heel part for relatively moving the holding member and the locking member to render the holding member inoperative.

24. A last comprising a heel part and a forepart arranged for relative collapsing movement, a locking member for positively holding the said parts against said collapsing movement, and another member mounted in the last for co-operation with the locking member automatically to hold it against automatic return to positive locking position, rendered operative by its movement of the locking member out of positively locking position prior to any substantial collapsing movement and said two members being relatively moved by relative movement of the forepart and heel part to determine their co-operation and permit the return of the locking member to positive locking position.

25. A last comprising a heel part and a forepart arranged for relative collapsing movement, a locking member for positively holding the said parts against said collapsing movement, another member mounted in the last for co-operation with the locking member to hold it out of positive locking position, the locking member and the said other member being constructed and arranged to engage for said holding operation as the locking member is moved from positive locking position, and an abutment in the last arranged to break the engagement between the said members as the last parts move relatively to permit the return of the locking member to positive locking position.

26. A last comprising a heel part and a forepart arranged for relative collapsing movement, a locking member for positively holding the said parts against said collapsing movement, another member mounted in the last for co-operation with the locking member to hold it out of positive locking position, the locking member and the said other member being constructed and arranged to engage for said holding operation as the locking member is moved from positive locking position, and an abutment in the last arranged to contact with one of the said members as the last parts move relatively to break the engagement between them.

27. A last comprising a heel part and a forepart arranged for relative collapsing movement, a locking member for positively holding the said parts against said collapsing movement, another member pivoted in the last for co-operation with the locking member to hold it out of positive locking position, the locking member and the said other member being constructed and arranged to engage for said holding operation as the locking member is moved from positive locking position, and an abutment in the last arranged to contact with one of the said members as the last parts move relatively to break the engagement between them.

28. A collapsible last comprising a heel part and a forepart, a hinge link joining said parts arranged to permit collapsing movement thereof, a positive locking strut extending from one last part to the other to hold them against collapse, and a holding member engaging said locking member as it moves out of positive locking position to hold it out of such position while the collapse begins, the parts being constructed and arranged to release the holding member during relative movement of the last parts.

29. A last comprising two last parts movably connected together, a detent movably mounted on one of said last parts, an abutment on the other of said last parts with which the detent cooperates positively to lock the last in an extended condition, means for locking the detent out of said locking position, and means for effecting the release of said detent on the collapsing of the last to permit the cooperation of the detent with the abutment upon the extension of the last.

30. A last comprising two last parts movably connected together, an abutment on one of said last parts, a detent movable on the other of said last parts and adapted to cooperate with the abutment positively to lock the last in an extended position, means for holding the detent out of said locking position, and means operable upon the collapsing of the last for releasing said detent to permit the latter to cooperate with the abutment upon the extension of the last.

31. A last comprising two movably connected last parts, a locking detent for positively locking the last in an extended condition, a spring acting on said detent to hold same in said positively locking position, and means for causing said spring action to cease holding said detent in said positively locking position when the detent is moved out of positively locking position and for automatically moving said causing means out of spring-inhibiting position when the last parts are shifted relatively to each other for the collapsing of the last.

32. A last comprising a pair of movably connected last parts, a locking detent for holding the last in an extended condition mounted on one of said last parts, a spring for acting on said detent to hold same in locking position, and means for causing said holding of the detent in said locking position by the spring to cease when the detent is moved out of positively locking position and for automatically determining the spring-inhibiting action of said causing means when the last is collapsed.

33. A last comprising two last parts movably connected together, a detent movably mounted on one of said last parts, an abutment on the other of said last parts with which the detent cooperates positively to lock the last in an extended condition, means acting automatically for locking the detent out of said locking position when displaced therefrom prior to any substantial collapsing movement of the last parts, and means for effecting the release of said detent to permit the cooperation of the detent with the abutment upon the extension of the last.

34. A last comprising two last parts movably connected together, an abutment on one of said last parts, a detent movable on the other of said last parts and adapted to cooperate with the abutment positively to lock the last in an extended position, means for automatically holding the detent against automatic return to said locking position when displaced therefrom, and means operating during collapse of the last to release said detent from said automatic holding.

35. A last comprising two movably connected last parts, a locking detent for positively locking the last in an extended condition, a spring acting on said detent to hold same in said positively locking position, and self-locking means for causing said spring action to cease holding said detent in said positively locking position when the lock is moved out of positvely locking position, prior to the production by the operator of any substantial collapsing movement of the last parts and for automatically moving said causing means out of spring-inhibiting position when the last parts are shifted relatively to each other.

36. A last comprising a pair of movably connected last parts, a locking detent for holding the last in an extended condition, mounted on one of said last parts, a spring for acting on said detent to hold same in positively locking position, and automatically acting means for causing said holding of the detent in said locking position by the spring to cease, rendered operative by its movement of the detent out of positively locking position prior to any substantial collapsing movement, and for automatically determining the spring-inhibiting action of said causing means during relative movement of the last parts.

37. A last comprising a heel part and a forepart arranged for relative collapsing movement, a locking member for positively holding the said parts against said collapsing movement, self-locking means for holding the said locking member against automatic return to positive locking position when disengaged therefrom prior to any substantial collapsing movement, and means comprising two abutments arranged to move relatively by virtue of the relative movement of the last parts in changing the length of the last, for automatically restoring the locking member to positive locking operativeness.

38. A last comprising a heel part and a forepart arranged for relative collapsing movement, a locking member for positively holding the said parts against said collapsing movement, means comprising two interacting and self-interlocking members for holding the said locking member against automatic return to positive locking position when disengaged therefrom prior to any substantial collapsing movement, said interlocking members being arranged to release each other during relative movement of the last parts, and means comprising two abutments arranged to move relatively during the change in length of the last for relatively moving the said interlocking members to prevent their automatic re-engagement.

39. A last comprising a heel part and a forepart arranged for relative collapsing movement, a locking member for positively holding the said parts against said collapsing movement, means comprising two interacting and self-interlocking members for holding the said locking member against automatic return to positive locking position when disengaged therefrom prior to any substantial collapsing movement, and means to release the interlock and prevent automatic re-engagement of the interlocking members comprising two abutments arranged to press on each other as the last collapses.

40. A last comprising a heel part and a forepart arranged for relative collapsing movement, a locking member for positively holding the said parts against said collapsing movement, means comprising two interacting and self-interlocking members for holding the said locking member against automatic return to positive locking position when disengaged therefrom prior to any substantial collapsing movement, and means to release the interlock of the interlocking members comprising two abutments arranged to press on each other as the last collapses.

41. A last comprising a heel part and a forepart arranged for relative collapsing movement, a locking member for positively holding the said parts against said collapsing movement, means comprising two interacting and self-interlocking members for holding the said locking member against automatic return to positive locking position when disengaged therefrom prior to any substantial collapsing movement, and means to release the interlock of the interlocking members comprising two abutments, one on the locking member and one on a part of the last moving relatively thereto as the last collapses.

42. A last comprising a heel part and a forepart arranged for relative collapsing movement, a locking member for positively holding the said parts against said collapsing movement, self-locking means for holding the said locking member against automatic return to positive locking position when disengaged therefrom prior to any substantial collapsing movement, and means comprising two abutments, one mounted in connection with the locking member and the other in connection with a part of the last which moves relatively to the locking member as the length of the last is changed, arranged to press upon each other during the change in length of the last to release the lock of the self-locking means.

In testimony whereof I have signed my name to this specification.

GEORGE G. SCHELTER.